L. W. SWOPE.
HEADLIGHT.
APPLICATION FILED JAN. 27, 1919.
1,341,947.
Patented June 1, 1920.
2 SHEETS—SHEET 2.
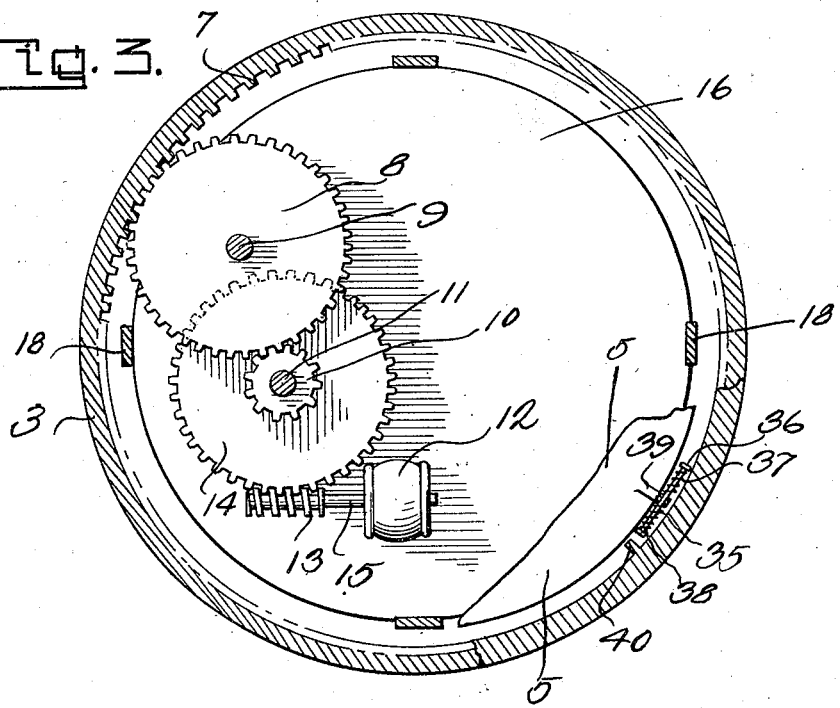
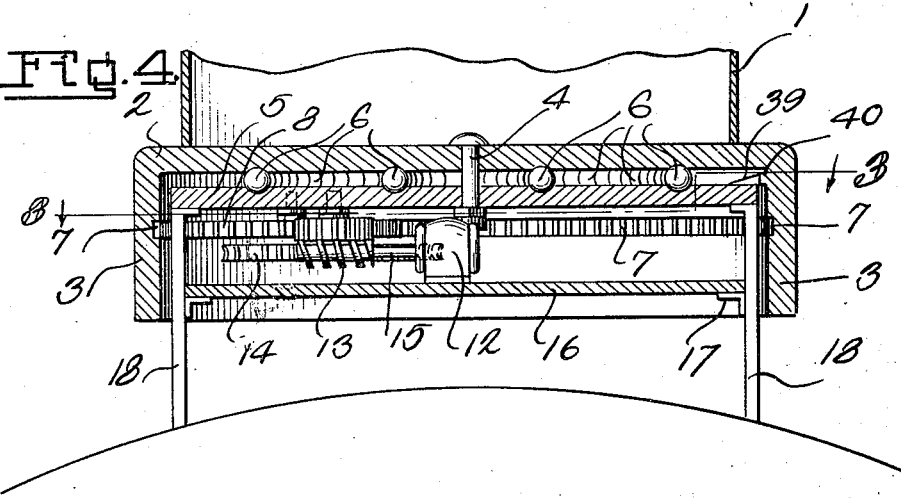
Inventor
L. W. Swope

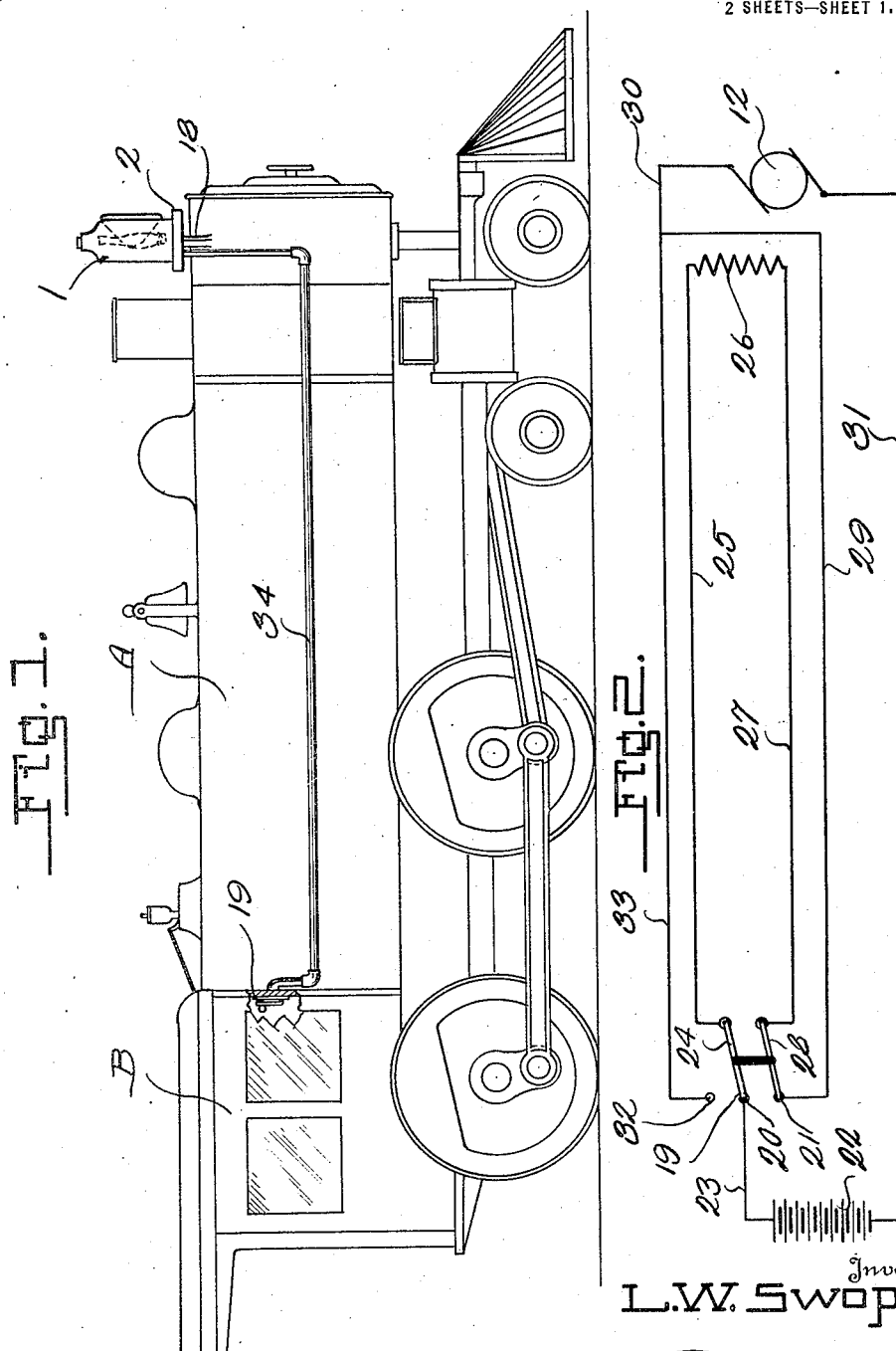

UNITED STATES PATENT OFFICE.

LEON W. SWOPE, OF VINCENNES, INDIANA, ASSIGNOR OF ONE-HALF TO MARY CAROLINE KELLY, OF VINCENNES, INDIANA.

HEADLIGHT.

1,341,947.  Specification of Letters Patent.  Patented June 1, 1920.

Application filed January 27, 1919. Serial No. 273,345.

*To all whom it may concern:*

Be it known that I, LEON W. SWOPE, a citizen of the United States, and a resident of Vincennes, in the county of Knox and State of Indiana, have invented certain new and useful Improvements in Headlights, of which the following is a specification.

This invention relates to a headlight for locomotives, boats, or vehicles, and an object of the invention is to provide means which may be operated from a point remote from the lamp or headlight, so as to direct the light rays from the lamp in any desired direction, such as along the tracks, when the latter is curved, rearwardly along the locomotive and train during loading or unloading of the train at night, or when repairs are necessary.

More specifically, the invention comprehends the provision of a rotatable headlight carrying platform, which has a gear thereon, and to operatively connect an electric motor, through the medium of speed reducing gears to the platform for rotating the same to regulate the direction of projection of the light rays from the headlight and also to provide a switch structure positioned in the cab of the locomotive, or near the pilot station of a boat, or vehicle for controlling the operation of the electric motor.

Another object of the invention is to provide means for reversing the direction of rotation of the rotor of the electric motor for regulating the direction of movement of the lamp carrying platform and also to provide a cushioned stop structure to prevent the rotation of the platform more than one complete revolution, thereby eliminating liability of the breaking of the electrical connection by the continued rotation of the platform.

Other objects of the invention will appear in the following detailed description, taken in connection with the accompanying drawings, forming a part of this specification, and in which drawings:

Figure 1 is a side elevation of the locomotive engine showing the improved headlight and its operating means applied thereto.

Fig. 2 is a diagrammatic view of the circuit employed for operating the headlight.

Fig. 3 is a horizontal section through the headlight operating means taken on the line 3—3 of Fig. 4.

Fig. 4 is a vertical section through the headlight operating means.

Referring more particularly to the drawings, A indicates an ordinary locomotive or steam engine which has the usual type of cab B from which the operation of the engine is controlled.

The headlight 1 is mounted upon a circular platform 2 which has a depending annular flange 3 formed thereon. The flange 3 forms a housing for the operating mechanism of the platform. The platform 2 is rotatably mounted upon a suitable stud or shaft 4 which is in turn carried by a stationary platform 5. Suitable bearing rollers 6 are positioned between the facing surfaces of the rotary platform 2 and the stationary platform 5 for reducing friction during the rotation of the platform 2.

The depending flange 3 has an internal gear 7 formed thereon, which meshes with a gear 8. The gear 8 is carried by a shaft 9 which is in turn supported by the stationary platform 5. The gear 8 meshes with a pinion 10 mounted upon a shaft 11 and this shaft 11 is rotated by the operation of an electric motor 12 of ordinary construction, through the medium of a worm 13 and worm gear 14. The worm gear 14 is mounted upon the shaft 11 while the worm 13 is carried by the shaft 15 of the motor structure 12.

The motor structure 12 is supported by an auxiliary platform 16 that is supported by suitable angled irons or brackets 17. The angled irons or brackets are carried by the supporting legs 18 of the stationary platform 5. The legs 18 are attached to the body of the engine A in any suitable manner.

The operation of the motor 12 is controlled by a double-pole switch structure 19, and when the switch structure 19 is positioned as shown in Fig. 2 of the drawings, namely in engagement with the contacts 20 and 21 the current will flow from the exciter 22, through the wire 23, the arm 24 of the switch structure, through the wire 25, field 26, wire 27, arm 28 of the switch, through the contact 21 and the wire 29, branching off into the wire 30 and consequently into the motor, through the motor 12 and the wire 31 back to the exciter 22 thus rotating the rotor of the motor 12 in one direction. When it is desired to reverse the direction of rotation of the rotor of the motor 12, for reversing the direction of movement of the lamp 1 the switch mechanism 19 is moved so that its arms 24 and 28 will contact with the contacts 20 and 32 respectively thus causing the current to flow through the wire 23, arm 28, wire 27, field 26, wire 25 to and through the arm 24 of the switch 19, and upwardly through the wire 33 to the wire 30 and through the motor 12 and back to the exciter 22 thus rotating the rotor of the motor in the direction reversely to the direction to which it is rotated when the switch is positioned as shown in Fig. 2 of the drawings.

The various wires extend through conduits 34 to the cab B of the engine in which the switch structure 19 is positioned so that either the engineer or fireman may operate the headlight operating mechanism from the cab of the engine.

A stop structure is provided for preventing more than one complete revolution of the rotatable platform 2 and this stop mechanism comprises a carrying rod 35 which is supported by suitable supports 36 upon the stationary platform 5. A pair of oppositely coiled spiral springs 37 and 38 are wound about the rod 35 and engage upon opposite sides of the stop bars 39 for resiliently supporting the stop bar. This stop bar 39 is positioned for engagement with a lug 40 formed upon the rotatable platform 2 and arresting rotation of the platform 2 and preventing breaking of the electrical connection with the lamp of the headlight in case an electric lamp is employed therein.

Changes in details may be made without departing from the spirit of this invention, but;

I claim:

1. In a headlight structure, the combination of a stationary platform, a rotatable platform mounted upon the stationary platform, a motor carried by the stationary platform, a depending flange formed on the periphery of the rotatable platform, and forming a housing for said stationary platform, and the motor, a ring gear carried by the inner surface of flange, speed reducing mechanism operatively connecting the motor with the ring gear, an inwardly extending lug formed on the inner surface of the flange, and outwardly extending apertured lugs formed on the stationary platform, a rod slidably mounted in the apertured lug, heads formed on the opposite terminals of the rod, and springs coiled around said rod, and engaging said heads and the apertured lug, the rod being arranged in the path of the flange carried lug.

2. In a headlight structure, the combination of a stationary platform, a rotatable platform rotatably supported by said stationary platform, a headlight carried by the rotatable platform, an electric motor, gearing connecting said electric motor and said rotatable platform for rotating the same, means for controlling the rotation of said motor whereby the rotary platform may be rotated in either direction, a sliding cushioned stop carried by the stationary platform, and means carried by the rotary platform arranged to engage the opposite ends of the sliding cushioned stop to prevent the rotation of said rotatable platform beyond one complete revolution irrespective of the direction of rotation thereof.

LEON W. SWOPE.